No. 607,207. Patented July 12, 1898.
N. ANKARSTOLPE.
PLOW.
(Application filed Sept. 29, 1897.)
(No Model.) 2 Sheets—Sheet 1.
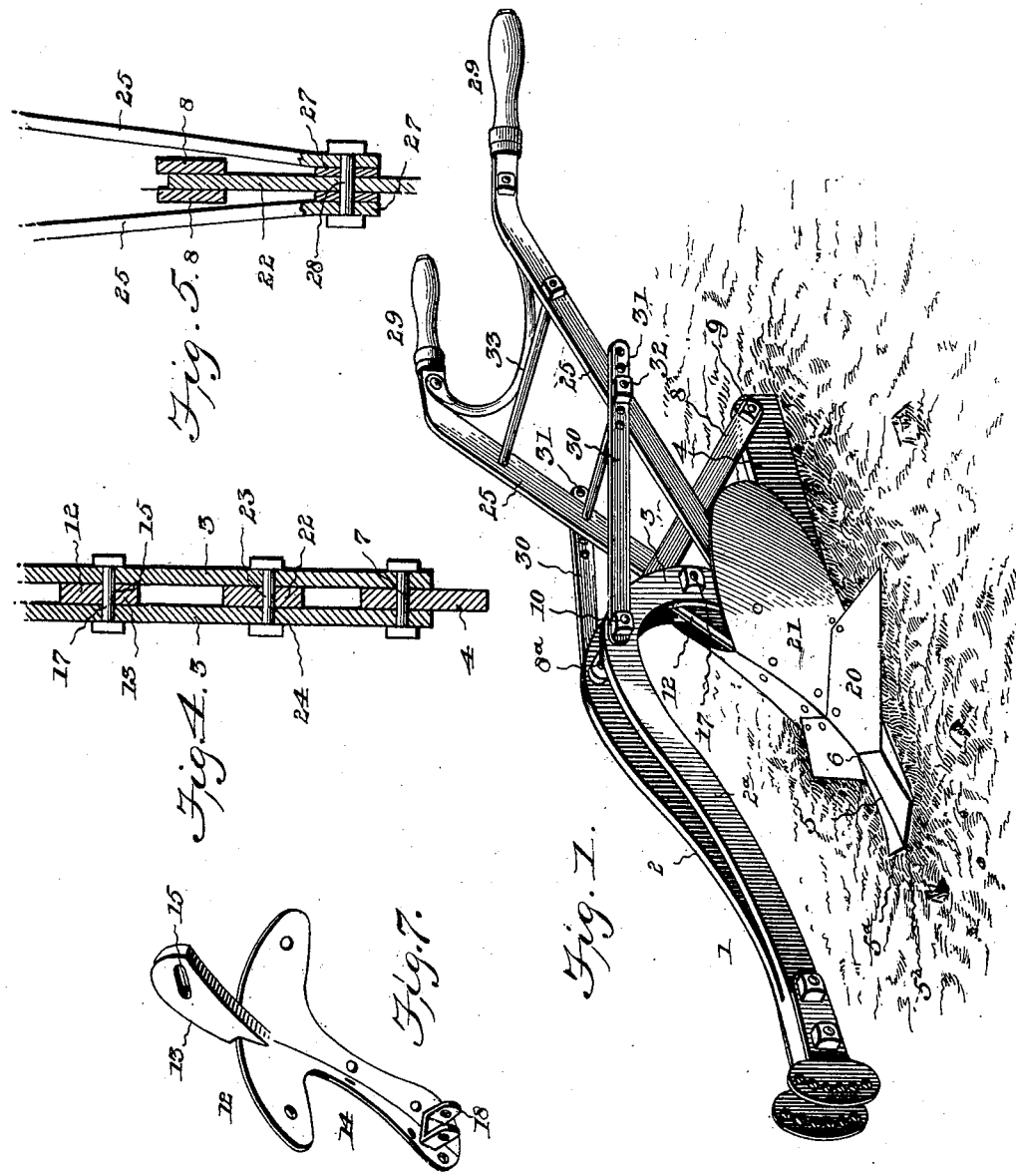
Witnesses
Inventor
Nels Ankarstolpe,
By his Attorneys,

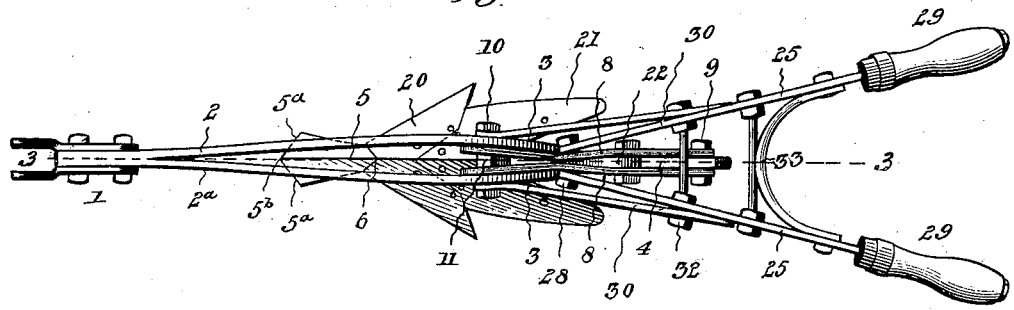
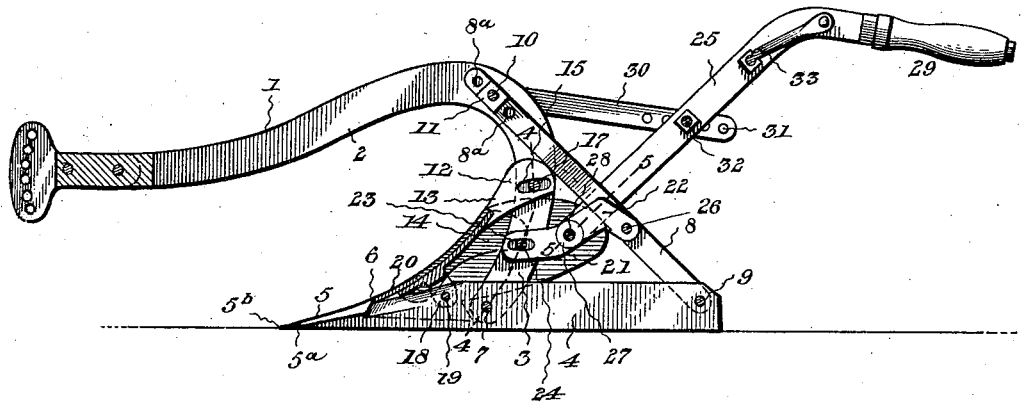
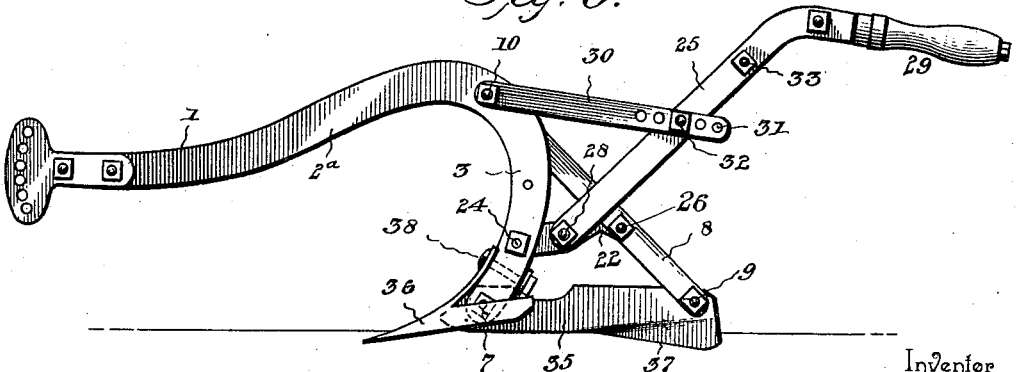

UNITED STATES PATENT OFFICE.

NELS ANKARSTOLPE, OF LUND, TEXAS.

PLOW.

SPECIFICATION forming part of Letters Patent No. 607,207, dated July 12, 1898.

Application filed September 29, 1897. Serial No. 653,517. (No model.)

*To all whom it may concern:*

Be it known that I, NELS ANKARSTOLPE, a citizen of the United States, residing at Lund, in the county of Travis and State of Texas, have invented a new and useful Plow, of which the following is a specification.

My invention relates to improvements in agricultural implements adapted for service as a middle-breaker or as a cotton-cultivator; and the primary object that I have in view is to provide a simple, strong, and compact arrangement of parts which may be easily adjusted for service to enable the implement to be used as a plow for breaking the middles of rows or a cultivator for cotton and other crops.

A further object of the invention is to provide means for adjusting the draft-beam to accommodate the plow for large and small draft-animals.

A further object of the invention is to provide the implement with means for adjusting the handle-bars to suit the operator, and this adjustment of the beam and the handles or of either of said parts may be effected without disturbing each other and the moldboards and share of the plow or the sweep of the cultivator.

With these ends in view and such others as will appear from the annexed description my invention consists in the novel combination of elements and in the construction and arrangement of parts which will be hereinafter fully described and claimed.

To enable others to understand my invention, I have illustrated the preferred embodiment thereof in the accompanying drawings, forming a part of this specification, and in which—

Figure 1 is a perspective view of my improved implement, showing it equipped with a double moldboard and share for the purpose of using the implement as a middle-breaker plow. Fig. 2 is a top plan view thereof. Fig. 3 is a vertical longitudinal sectional elevation on the plane indicated by the dotted line 3 3 of Fig. 2. Figs. 4 and 5 are vertical transverse sectional views on the planes indicated by the dotted lines 4 4 and 5 5, respectively, of Fig. 3. Fig. 6 is an elevation showing the implement adjusted for service as a cultivator. Fig. 7 is a detail view of the carrier on which the double moldboard and share are mounted.

Like numerals of reference denote corresponding and like parts in each of the figures of the drawings.

I construct my implement with a simple but substantial beam, which is indicated at 1 in the drawings. This beam is composed of two lengths of metal 2 $2^a$, which are bent to the required form, and these bars or lengths of metal are united rigidly together at the front end of the beam, as by welding the lengths together in any approved manner. The rear ends of the lengths of metal are curved downward and forward to provide the stock or foot 3, and said lengths are spread laterally from the front extremity of the beam, where the lengths are united together by welding, in order that the braces and the carrier may be readily attached to the curved foot or stock of the beam.

To enable the beam to be used as a middle-breaker plow, I provide the foot-bar 4. This foot-bar consists of a suitable length of bar-metal, to the front extremity of which is welded or otherwise united a point 5, preferably of steel. This point 5 is of wedge shape both longitudinally and transversely, and the front edge of the point has the beveled or inclined edges $5^a$, which meet at the medial line of the foot-bar to form the prow $5^b$. The upper inclined face of the point extends above the top of the edge foot-bar, and the rear edge of this inclined or sloped upper face of the point is provided with the double bevel that forms a seat 6 for the double share.

The curved ends of the lengths of the beam that form the stock are extended downward to receive between their lowermost extremities the foot-bar 4, and this foot-bar and the beam-stock are united together by means of a bolt 7, which passes through registering openings in said parts.

The foot-bar and the stock or foot are joined together at a point intermediate of the length of the foot-bar, and said foot-bar extends rearwardly a suitable distance beyond the foot or stock of the beam. The rear extremity of the foot-bar and the curved rear end of the beam are joined and braced by means of the link-like braces 8, which are arranged parallel to each other and in inclined positions between the beam and the foot-bar. The lower rear ends of the braces or stays 8 are fastened to the foot-bar 4 by means of a through-bolt 9; but the upper forward ends of said inclined braces or stays 8 are provided with a series of three or more apertures 8ª for the passage of the bolt 10, whereby the inclined braces may be adjustably attached to the beam 1. The front upper ends of said braces or stays are arranged between the lengths or bars of the two-part beam, and between these braces is fitted a spacing-block 11, the bolt 10 passing through the lengths or bars of the beam, the braces, and the spacing-block, as clearly indicated by Fig. 2.

The carrier 12 is provided for the attachment and support of the double moldboard and the double share. This carrier consists of the bar or shank 13 and the wings 14, all of which may be cast in a single piece of metal. The wings 14 of the carrier diverge from each other and incline rearwardly alongside of the shank, and said wings are of a length suitable for the attachment both of the moldboard and the share. The upper end of the shank or bar 13 of the carrier is provided with a slot 15, and said slotted end of the carrier-shank is fitted or adjusted between the bars or lengths of the beam at the curved part thereof forming the stock or foot. This shank or bar of the carrier is fastened adjustably in place within the stock or foot of the beam by means of a bolt 17, and said bolt passes through suitable holes in the foot or stock and through the slot in the shank of the carrier. The lower extremity of the carrier is fastened to the foot-bar 4 by means of a clasp or bracket 18, which is suitably fastened to or made integral with the carrier, and said clasp or bracket is arranged to embrace the foot-bar at a point in advance of the bolt connection 7 between the foot-bar 4 and the stock or foot of the beam 1, said clasp or bracket 18 and the foot-bar being united detachably together by the bolt 19.

The double share 20 is adapted to be applied to have its lower edge fit in the seat formed by and between the point and the foot-bar, and this share is bolted to the wings of the carrier 12 in order that the share may be readily detached when required. The double moldboard 21 is also applied to the wings of the carrier above the share 20, and said moldboard is also fastened detachably to the carrier by bolts in any approved manner. The moldboard is made in two or more sizes to enable the plow to do heavy or light work, and the different sizes of moldboard are adapted to be used interchangeably on the carrier and in proper operative relation to the share and the point without requiring any change in the plow except the removal of one size of moldboard and the application of another sized moldboard to the carrier and the share.

The handle-bars of my improved plow or implement are attached in a novel manner to enable them to be adjusted to different heights to suit the operator, and the means for the attachment of the handle-bars also furnishes braces to strengthen the connection between the various parts of the implement. Between the foot or stock of the beam and the inclined braces or stays 8 is arranged a transverse brace-bar 22, which occupies a substantially horizontal position between the parts just mentioned. The front end of the transverse brace or bar 22 is provided with a longitudinal slot 23, and this slotted end of the brace-bar is fitted between the sides of the foot or stock at a point between the bolt connection 7 of the stock to the foot-bar and the bolt connection 17 of the carrier-shank to the foot or stock, said slotted end of the brace-bar 22 being fastened adjustably to the foot or stock by means of the bolt 24, thus adjustably attaching the means for supporting the handle-bars 25 to the foot or stock. The rear end of the brace 22 is fitted between the braces or stays 8, and said rear end of the transverse brace-bar 22 and the braces or stays 8 are fastened together by a bolt 26.

The handle-bars 25 of the implement are made of metal bent to the proper form, and the lower ends of these handle-bars are carried down to and applied laterally against the transverse brace-bar 22, suitable washers 27 being interposed between the brace-bar and the handle-bars. A bolt 28 is passed through the brace-bar 22 and the handle-bars to unite the parts together, and thus the handle-bars are sustained by the transverse brace-bar in a secure and steady manner, and at the same time the brace-bar may be moved vertically by reason of its slotted connection with the foot or stock of the beam for the purpose of adjusting the handles to suit the operator. The upper rear ends of the handle-bars are extended to receive the wooden handles 29 to be grasped by the hands of the driver. The handle-bars 25 are also braced to the beam by the stay bars or rods 30, the front ends of which are fastened to the beam by the bolt 10, thus making the bolt serve as the means for the attachment of the braces 8 and the braces 30 to the beam. The rear ends of the braces 30 have a series of holes 31, and a long bolt 32 is used for adjustably fastening the braces 30 to the handle-bars. The handle-bars are braced or stayed between themselves by the stay 33.

The implement when equipped with the foot-bar 4, the carrier 12, the double share 20, and the double moldboard is especially well adapted for service as a middle-breaker for the hills in which corn or cotton has been planted. This adaptation of the parts of the plow enables the implement to be run through the middles of the rows and to throw the dirt to both sides of the furrow, thus breaking up the ridges and only requiring the plow to be run through the old ridges one time to form new ridges instead of using a common plow, which requires the plow to be run through the furrows three or four times to form new ridges. By the employment of the foot-bar with the point and by fitting the share to the seat on the foot-bar and point the share is raised above the level of the bottom edge of the foot-bar, and thus the implement is adapted to run easier and with lighter draft, whereby the labor is reduced and one man with a three-horse team is able to perform the service which requires the services of two men with six horses and two of the common form of plows.

To enable my implement to be used as a cultivator for tilling the soil around corn, cotton, and other crops, I detach the foot-bar 4, the share, the moldboard, and the carrier, and in lieu of these elements I use the foot-bar 35 and the sweep 36. (Shown by Fig. 6 of the drawings.) The foot-bar 35 is a metallic bar having welded to its rear part a cutter 37, disposed in a vertical plane to extend below the lower edge of said bar 35 for a suitable distance. The bar 35 has a beveled front extremity forming a seat for the sweep 36, and said bar is fitted between the sides of the stock or foot and the braces or stays 8, the bolts 7 and 9 being used to attach the foot-bar 35 to the foot or stock and the braces 8. The sweep 36 is adjusted against the front side of the foot or stock of the beam and the beveled front end of the foot-bar 35, and through the upper part of the sweep is passed an attaching-bolt 38, which is fitted between the sides of the foot or stock between the bolt 7 and the bolt 22.

Any suitable style of shovel or point may be used on the implement when adjusted for service as a cultivator.

From the foregoing description it will be seen that I have attached the several parts of the implement to the beam in a manner to permit the beam to be raised or lowered as may be required to adapt the implement for service in connection with draft-animals of different sizes. The handle-bars are attached to the beam by means which enable the bars to be raised or lowered, as required, and this adjustment of the handle-bars may be effected independently of the adjustment of the beam, and vice versa.

I am aware that changes in the form and proportion of parts and in the details of construction of the devices herein shown and described as the preferred embodiment of my invention may be made by a skilled mechanic without departing from the spirit or sacrificing the advantages of the invention, and I therefore reserve the right to make such modifications and alterations as fairly fall within the scope of the invention.

Having thus fully described my invention, what I claim as new, and desire to secure by Letters Patent, is—

1. The combination with a plow-beam having a downwardly-curved stock, of a foot-bar attached at a point intermediate of its length directly to said beam-stock, inclined braces attached to the foot-bar and beam, a substantially horizontal brace-bar attached to the inclined braces and adjustably fastened to the beam-stock, and the handles attached to the brace-bar and linked to the beam, substantially as described.

2. The combination with a beam, and a foot-bar, of inclined braces attached to the foot-bar and adjustably attached to the beam, a brace-bar attached to the inclined braces and adjustably fastened to the foot or stock formed by the beam, handle-bars fastened to the brace-bar between the foot or stock and the inclined braces, and braces between the beam and the handle-bars, as and for the purposes described.

3. The combination with a beam having a foot or stock, a foot-bar, and inclined braces, of a transverse brace-bar attached to the inclined braces and adjustably fastened to the foot or stock, handle-bars fastened to the transverse brace-bar between its attachment to the inclined braces and adjustable connection to the foot or stock, and suitable braces for the handle-bars, as and for the purposes described.

4. The combination with a beam having a foot or stock, of a foot-bar bolted at a point intermediate of its length to said foot or stock and provided at its front extremity with an integral tapered point and with a seat in rear of the cutting edges of said point, a winged carrier fastened to the foot and having a clasp which embraces the foot-bar and is detachably bolted thereto, a share fitted to the seat of the point and fastened to the winged carrier, and a moldboard attached to said carrier, substantially as described.

5. The combination with a beam having a foot or stock, and a foot-bar, of a carrier fastened adjustably to the foot or stock and to the foot-bar, the share and moldboard mounted on said carrier, inclined braces between the foot-bar and the beam and adjustably fastened to the latter, and means for the attachment of the handles, as and for the purposes described.

6. The combination with a beam having a foot or stock, and a foot-bar, of a carrier mounted adjustably on the foot or stock and detachably fastened to the foot-bar, inclined braces adjustably fastened to the beam, a brace-bar attached to the inclined braces and adjustably fastened to the foot or stock, handle-bars attached to the brace-bar, and braces attached to the handle-bars and to the beam, as and for the purposes described.

In testimony that I claim the foregoing as my own I have hereto affixed my signature in the presence of two witnesses.

NELS ANKARSTOLPE.

Witnesses:
R. P. JONES,
SAM FLOYD.